(12) United States Patent
Takamoto

(10) Patent No.: US 11,550,519 B2
(45) Date of Patent: Jan. 10, 2023

(54) TERMINAL DEVICE, METHOD FOR CONTROLLING TERMINAL DEVICE, AND RECORDING MEDIUM

(71) Applicant: SEIKO EPSON CORPORATION, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/649,702

(22) Filed: Feb. 2, 2022

(65) Prior Publication Data

US 2022/0253256 A1 Aug. 11, 2022

(30) Foreign Application Priority Data

Feb. 5, 2021 (JP) .............................. JP2021-017173

(51) Int. Cl.
*G06F 15/00* (2006.01)
*G06F 3/12* (2006.01)
*G06K 1/00* (2006.01)
*H04N 1/327* (2006.01)

(52) U.S. Cl.
CPC .......... *G06F 3/1204* (2013.01); *G06F 3/1231* (2013.01); *G06F 3/1292* (2013.01); *H04N 1/32778* (2013.01)

(58) Field of Classification Search
CPC .... G06F 3/1204; G06F 3/1231; G06F 3/1292; H04N 1/32778

USPC ............................... 358/1.15, 1.14, 1.13, 1.1
See application file for complete search history.

(56) References Cited

U.S. PATENT DOCUMENTS

| 10,537,793 | B2* | 1/2020 | Morishita | ............. H04W 4/025 |
| 2007/0229891 | A1* | 10/2007 | Yanagi | .................... H04L 67/52 |
| | | | | 358/1.15 |
| 2020/0310729 | A1 | 10/2020 | Nampo | |
| 2021/0110383 | A1* | 4/2021 | Hamasako | ........... G06Q 20/322 |

FOREIGN PATENT DOCUMENTS

JP 2020-157656 A 10/2020

* cited by examiner

*Primary Examiner* — Douglas Q Tran
(74) *Attorney, Agent, or Firm* — Workman Nydegger

(57) ABSTRACT

A terminal device includes a first acquisition unit acquiring identification information of a target terminal device in a communicable state with a printing apparatus, a second acquisition unit acquiring respective pieces of identification information of one or more search terminal devices searched based on transmission of one or more search signals for searching for the target terminal device, a third acquisition unit acquiring respective pieces of distance information indicating distances to the one or more search terminal devices, and a notification controller. The notification controller causes a notifier to provide a notification of the distance information indicating a distance to the search terminal device identified by a target identification information, that is identification information identical to the identification information of the target terminal device acquired by the first acquisition unit, among the respective pieces of distance information acquired by the third acquisition unit.

10 Claims, 13 Drawing Sheets

TERMINAL DEVICE, METHOD FOR CONTROLLING TERMINAL DEVICE, AND RECORDING MEDIUM

The present application is based on, and claims priority from JP Application Serial Number 2021-017173, filed Feb. 5, 2021, the disclosure of which is hereby incorporated by reference herein in its entirety.

BACKGROUND

1. Technical Field

The present disclosure relates to a terminal device, a method for controlling a terminal device, and a recording medium.

2. Related Art

As disclosed in JP-A-2020-157656, a terminal device that transmits print data to a printing apparatus via wireless communication has been known. Some of the operating systems (OSs) for use in terminal devices allow only one terminal device to be connected to one printing apparatus when, for example, Bluetooth (registered trademark) communication is used. If a printing apparatus described in JP-A-2020-157656, which has been connected to a first terminal device, receives a connection request from a second terminal device running such an OS, the printing apparatus notifies the second terminal device that any additional connection is not possible and requests the first terminal device to cancel the connection. A user operating the first terminal device cancels the connection between the first terminal device and the printing apparatus in response to the connection cancel request, thereby enabling the second terminal device to be connected to the printing apparatus.

In the techniques disclosed in JP-A-2020-157656, unless the user operating the first terminal device performs an operation of cancelling connection with the printing apparatus, it is not possible for the second terminal device to establish a connection with the printing apparatus. Assuming that there are a plurality of terminal devices that may be connected to a printing apparatus and that nobody is operating the first terminal device, a user operating the second terminal device may not be aware that the first terminal device is connected to the printing apparatus.

SUMMARY

A terminal device according to the present disclosure includes a first communicator configured to transmit print data to a printing apparatus via wireless communication, a first acquisition unit configured to acquire identification information of a target terminal device in a communicable state with the printing apparatus, a second acquisition unit configured to acquire respective pieces of identification information of one or more search terminal devices searched based on transmission of one or more search signals for searching for the target terminal device, a third acquisition unit configured to acquire respective pieces of distance information indicating distances to the one or more search terminal devices, a notifier configured to notify a user of information, and a notification controller configured to, when the respective pieces of identification information of the one or more search terminal devices acquired by the second acquisition unit include target identification information that is identification information identical to the identification information of the target terminal device acquired by the first acquisition unit, cause the notifier to provide a notification of the distance information indicating a distance to the search terminal device identified by the target identification information among the respective pieces of distance information acquired by the third acquisition unit.

A terminal device according to the present disclosure includes a first communicator configured to transmit print data to a printing apparatus via wireless communication, a first acquisition unit configured to acquire identification information of a target terminal device in a communicable state with the printing apparatus, a second acquisition unit configured to acquire respective pieces of identification information of one or more search terminal devices searched based on transmission of one or more search signals for searching for the target terminal device, a fourth acquisition unit configured to acquire respective pieces of location information indicating locations of the one or more search terminal devices, a notifier configured to notify a user of information, and a notification controller configured to, when the respective pieces of identification information of the one or more search terminal devices acquired by the second acquisition unit include target identification information that is identification information identical to the identification information of the target terminal device acquired by the first acquisition unit, cause the notifier to provide a notification of the location information indicating a location of the search terminal device identified by the target identification information among the respective pieces of location information acquired by the fourth acquisition unit.

A method for controlling a terminal device according to the present disclosure transmits print data to a printing apparatus via wireless communication. The method includes acquiring identification information of a target terminal device in a communicable state with the printing apparatus, acquiring respective pieces of identification information of one or more search terminal devices searched based on transmission of one or more search signals for searching for the target terminal device, acquiring respective pieces of distance information indicating distances to the one or more search terminal devices, and, when the respective pieces of acquired identification information of the one or more search terminal devices include target identification information that is identification information identical to the acquired identification information of the target terminal device, providing a notification of the distance information indicating a distance to the search terminal device identified by the target identification information among the respective pieces of acquired distance information.

A non-transitory computer-readable recording medium according to the present disclosure records a program that causes a terminal device, which transmits print data to a printing apparatus via wireless communication, to execute acquiring identification information of a target terminal device in a communicable state with the printing apparatus, acquiring respective pieces of identification information of one or more search terminal devices searched based on transmission of one or more search signals for searching for the target terminal device, acquiring respective pieces of distance information indicating distances to the one or more search terminal devices, and, when the respective pieces of acquired identification information of the one or more search terminal devices include target identification information that is identification information identical to the acquired identification information of the target terminal device, providing a notification of the distance information indicating a distance to the search terminal device identified by the target identification information among the respective pieces of acquired distance information.

DESCRIPTION OF EXEMPLARY EMBODIMENTS

First Embodiment

Figure 1:
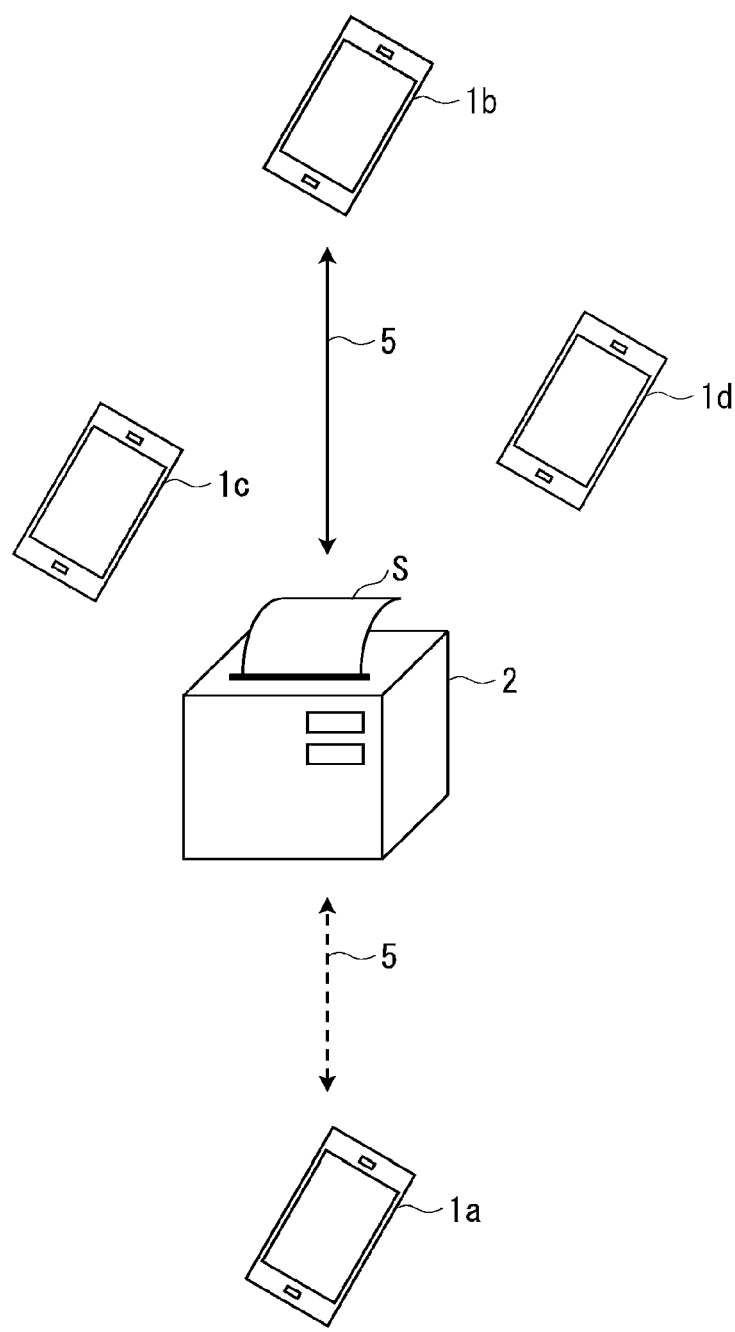
FIG. 1 is a pictorial representation illustrating an example of a usage pattern of a terminal device.

A terminal device, a method for controlling a terminal device, and a recording medium according to an embodiment will be described below with reference to the accompanying drawings. FIG. 1 is a pictorial representation illustrating an example of a usage pattern of a terminal device 1. The usage pattern illustrated in FIG. 1 includes four terminal devices 1 and one receipt printer 2. The receipt printer 2 is an example of a "printing apparatus". The four terminal devices 1 and the one receipt printer 2 communicate with each other via first wireless communication 5. In the first embodiment, the terminal device 1 is assumed to be a smartphone. The first wireless communication 5 is an example of "wireless communication". The first wireless communication 5 is assumed to be Bluetooth (registered trademark) communication.

In the first embodiment, a situation is assumed in which a user operating a first terminal device 1a wants to connect the first terminal device 1a to the receipt printer 2 but is unable to connect the first terminal device 1a to the receipt printer 2 because the receipt printer 2 has already been connected to another terminal device 1. That is, in FIG. 1, the first terminal device 1a represents the terminal device 1 that is unable to be connected to the receipt printer 2 via the first wireless communication 5. The first terminal device 1a is an example of a "terminal device", which is the main constituent of the disclosure. In the first embodiment, being connected refers to a pairing status in Bluetooth communication. Being connected is an example of a "communicable state".

In FIG. 1, three terminal devices, a second terminal device 1b, a third terminal device 1c, and a fourth terminal device 1d, represent the terminal devices 1 that are likely to be connected to the receipt printer 2 via the first wireless communication 5. In FIG. 1, the second terminal device 1b represents the terminal device 1 that has already been connected to the receipt printer 2 via the first wireless communication 5.

In such a situation, the user operating the first terminal device 1a need to identify the second terminal device 1b, which has already been connected to the receipt printer 2, among the three terminal devices 1, which are each likely to be connected to the receipt printer 2, and need to operate the second terminal device 1b so as to cancel the connection between the second terminal device 1b and the receipt printer 2. After causing the second terminal device 1b to cancel the connection with the receipt printer 2, the user operating the first terminal device 1a causes the first terminal device 1a to be connected to the receipt printer 2.

In the first terminal device 1a, a search application 33 (refer to FIG. 2) is installed to allow the user to identify the second terminal device 1b. The first terminal device 1a uses the search application 33 to search for the terminal device 1 that is connected to the receipt printer 2, and notifies the user of a search result.

In the first terminal device 1a, a point of sale system (POS) application 32 (refer to FIG. 2) is installed so that the first terminal device 1a functions as a POS terminal. The receipt printer 2 carries out printing on a printing medium S based on print data transmitted from the first terminal device 1a, thereby issuing a receipt.

Figure 2:
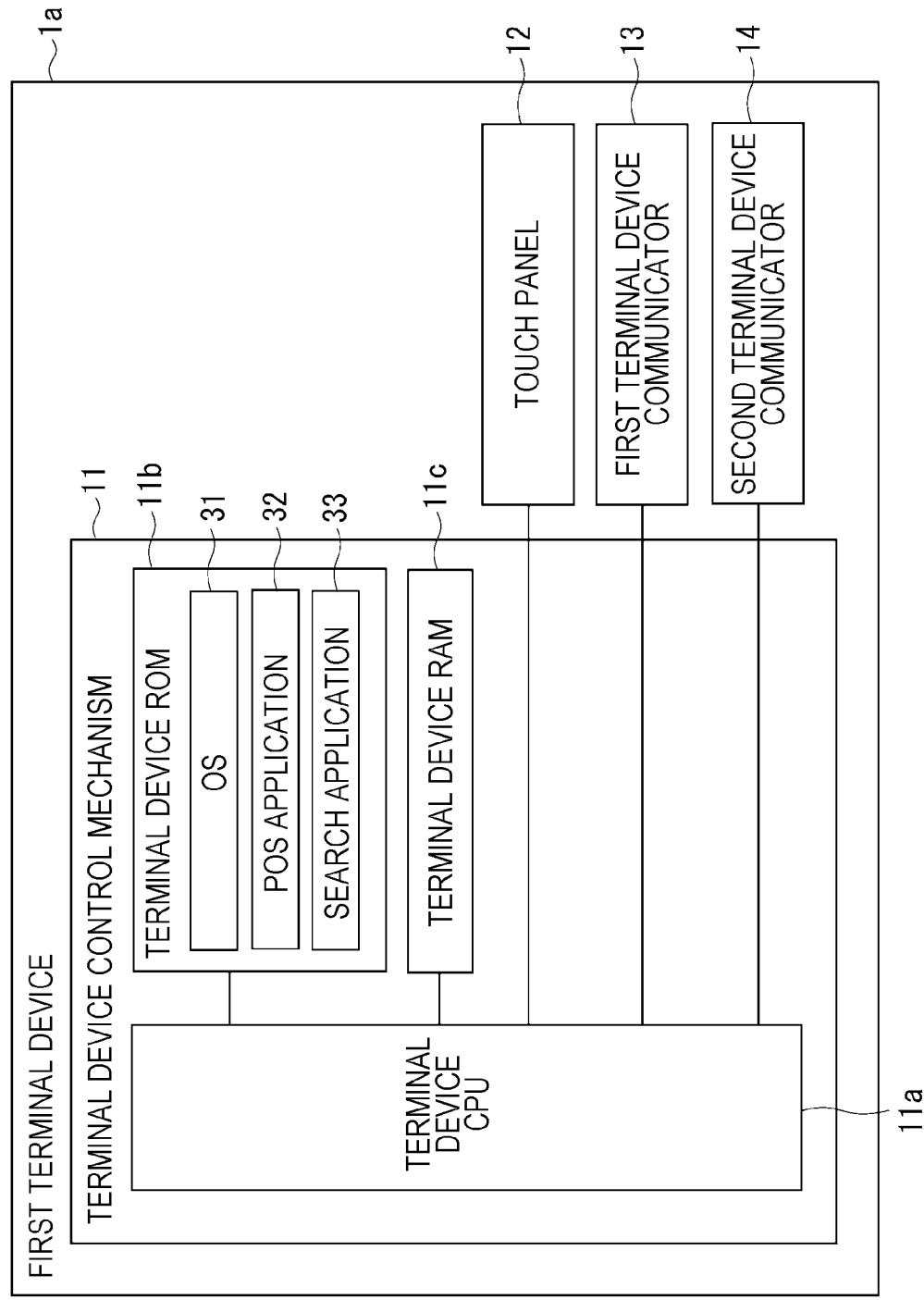
FIG. 2 is a block diagram illustrating a hardware configuration of a first terminal device.

FIG. 2 is a block diagram illustrating a hardware configuration of the first terminal device 1a. The first terminal device 1a includes a terminal device control mechanism 11, a touch panel 12, a first terminal device communicator 13, and a second terminal device communicator 14. The touch panel 12 is examples of a "notifier" and a "display". The first terminal device communicator 13 is an example of a "first communicator". The second terminal device communicator 14 is an example of a "second communicator".

The terminal device control mechanism 11 includes a terminal device central processing unit (CPU) 11a, a terminal device read-only memory (ROM) 11b, and a terminal device random-access memory (RAM) 11c.

The terminal device CPU 11a is a processor that controls units in the first terminal device 1a. The terminal device control mechanism 11 may use, as a processor, hardware circuitry such as an application specific integrated circuit (ASIC). The processor may have a configuration in which one or more CPUs and hardware circuitry such as an ASIC operate in cooperation with each other.

The terminal device ROM 11b is a rewritable ROM storing an operating system (OS) 31, the POS application 32, and the search application 33. The search application 33 is an example of a "program".

The OS 31 is basic software for running various application programs, such as the POS application 32, and for enabling operation of hardware, such as the touch panel 12. The OS 31 according to the first embodiment is assumed to allow only one terminal device 1 running the OS 31 to be connected to one receipt printer 2. The OS 31 according to the first embodiment is assumed to have a function of enabling the terminal device 1, which has already established a connection with the receipt printer 2 by using the first wireless communication 5, to automatically establish a connection with the receipt printer 2 in response to a change of the receipt printer 2 from the power-off state to the power-on state or in response to the receipt printer 2 entering the communication range. The OS 31 is, for example, iOS (registered trademark).

The POS application 32 is an application program for the terminal device CPU 11a to perform accounting processing and to perform communication processing with the receipt printer 2. The terminal device CPU 11a generates print data for printing a receipt by using the POS application 32.

The search application 33 is an application program for searching for the terminal device 1 that is connected to the receipt printer 2. When a user operating the first terminal device 1a tries to connect the first terminal device 1a to the receipt printer 2 in order to communicate with the receipt printer 2 by using the POS application 32 but the connection is cut off by the receipt printer 2, the user starts the search application 33. Using the started search application 33, the first terminal device 1a searches for the terminal device 1 that is connected to the receipt printer 2. The search application 33 is not necessarily limited to another application than the POS application 32 but, for example, may be included in the POS application 32.

The terminal device RAM 11c is used as a work area where the terminal device CPU 11a performs various types of arithmetic processing.

The touch panel 12 is used to receive a user operation and to display information. In the first embodiment, the touch panel 12 is used to start the search application 33 and to display a result of searching using the search application 33.

The first terminal device communicator 13 uses the first wireless communication 5 to communicate with the receipt printer 2.

The second terminal device communicator 14 uses a second wireless communication 6 to communicate with the receipt printer 2. The second wireless communication 6 uses a communication standard different from that of the first wireless communication 5. In the first embodiment, the second wireless communication 6 is assumed to be Bluetooth Low Energy (BLE) communication.

Regarding the terminal devices 1 other than the first terminal device 1a illustrated in FIG. 1, the hardware configuration, of which description is omitted, may be the same or different from the hardware configuration of the first terminal device 1a.

Figure 3:
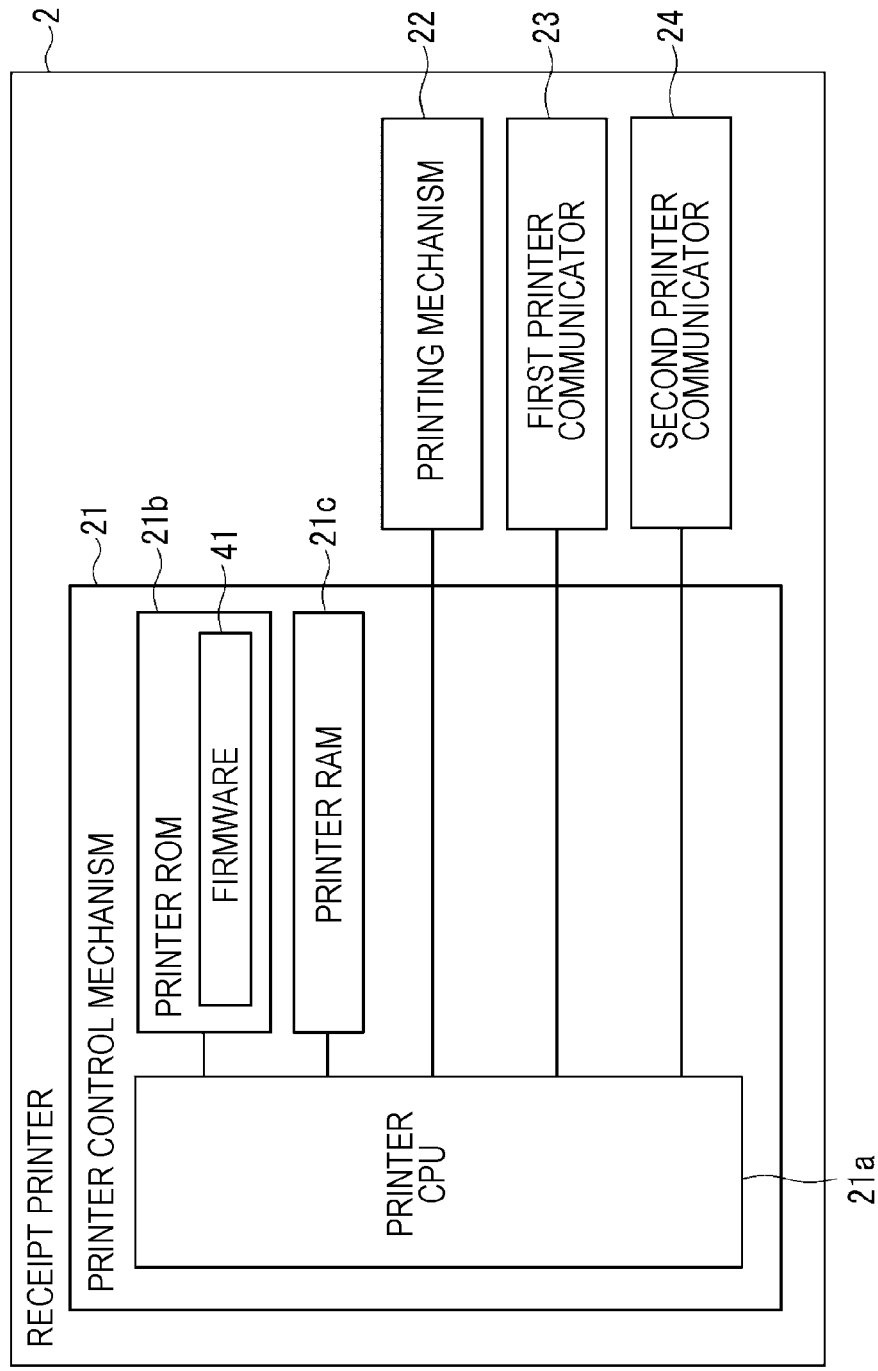
FIG. 3 is a block diagram illustrating a hardware configuration of a receipt printer.

FIG. 3 is a block diagram illustrating an example of a hardware configuration of the receipt printer 2. The receipt printer 2 includes a printer control mechanism 21, a printing mechanism 22, a first printer communicator 23, and a second printer communicator 24.

The printer control mechanism 21 includes a printer CPU 21a, a printer ROM 21b, and a printer RAM 21c.

The printer CPU 21a is a processor that controls units in the receipt printer 2. The printer control mechanism 21 may use, as a processor, hardware circuitry such as an ASIC. The processor may have a configuration in which one or more CPUs and hardware circuitry such as an ASIC operate in cooperation with each other.

The printer ROM 21b stores firmware 41. The firmware 41 is software for the printer CPU 21a to control various types of hardware, such as the printing mechanism 22, in the receipt printer 2.

The printer RAM 21c is used as a work area where the printer CPU 21a performs various types of arithmetic processing.

The printing mechanism 22 performs printing on a printing medium S. The printing mechanism 22 includes a print head, a head drive mechanism, a printing medium transport mechanism, and other components. As the print head, for example, an ink jet head is employed when the receipt printer 2 is an ink jet printer and a thermal head is employed when the receipt printer 2 is a thermal head printer.

The first printer communicator 23 uses the first wireless communication 5 to communicate with the first terminal device 1a, the second terminal device 1b, the third terminal device 1c, and the fourth terminal device 1d.

The second printer communicator 24 uses the second wireless communication 6 to communicate with the first terminal device 1a.

Figure 4:
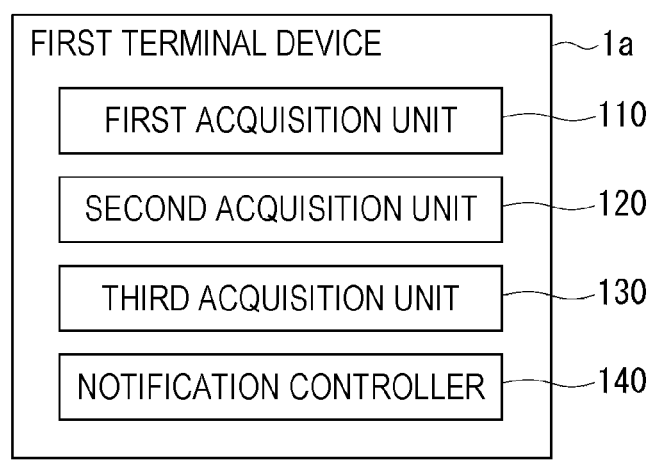
FIG. 4 is a block diagram illustrating a functional configuration of the first terminal device.

FIG. 4 is a block diagram illustrating a functional configuration of the first terminal device 1a. The first terminal device 1a includes, as a functional configuration, a first acquisition unit 110, a second acquisition unit 120, a third acquisition unit 130, and a notification controller 140. All these functions are functions implemented by the terminal device CPU 11a executing the search application 33.

The first acquisition unit 110 acquires the address of the terminal device 1 connected to the receipt printer 2, that is, the address of the second terminal device 1b, and the printer name of the receipt printer 2 from the receipt printer 2 via the second terminal device communicator 14. The address is an example of "identification information". The address is a MAC address for Bluetooth communication. The terminal device 1 that is connected to the receipt printer 2 will be referred to below as a "target terminal device 1". The first acquisition unit 110 transmits, via the second terminal device communicator 14, a request signal for requesting the address of the target terminal device 1 to the receipt printer 2, and acquires the address of the target terminal device 1 as a response signal to the request signal.

The second acquisition unit 120 acquires the address of the terminal device 1 searched based on transmission of a search signal for searching for the terminal device 1 and the terminal name of the terminal device 1. The terminal device 1 searched based on transmission of a search signal will be referred to below as a "search terminal device 1". The second acquisition unit 120 transmits, via the first terminal device communicator 13, search signals to the terminal devices 1 in the communication range of the first wireless communication 5 and acquires the respective addresses of the search terminal devices 1 as response signals to the search signals.

The third acquisition unit 130 acquires distance information indicating a distance from the first terminal device 1a to the search terminal device 1. The third acquisition unit 130 acquires the respective distances from the first terminal device 1a to the search terminal devices 1 based on the signal intensities of the response signals respectively transmitted from the second terminal device 1b, the third terminal device 1c, and the fourth terminal device 1d and acquires respective pieces of distance information indicating the measured distances.

Using information acquired by the second acquisition unit 120 and the third acquisition unit 130, the notification controller 140 causes the touch panel 12 to display a search result list 60 (refer to FIG. 5) in which, for each of the search terminal devices 1, the terminal name, the address, the distance information, and the connection state of the search terminal device 1 are associated with one another. The address displayed on the touch panel 12 is an example of "display information corresponding to identification information". Information including terminal names, addresses, distance information, and connection states will be referred to below as "device search information 61" (refer to FIG. 5).

When the addresses of the search terminal devices 1 acquired by the second acquisition unit 120 include a target address that is the same as the address of the target terminal device 1 acquired by the first acquisition unit 110, the notification controller 140 causes the touch panel 12 to display device search information 61 of the search terminal device 1 identified by the target address in a different manner from those of the device search information 61 of the other search terminal devices 1. That is, the notification controller 140 causes the touch panel 12 to display the device search information 61 of the second terminal device 1b in a different manner from those of the device search information 61 of the third terminal device 1c and the fourth terminal device 1d. This enables the user to check at a glance the device search information 61 of the search terminal device 1 connected to the receipt printer 2 among the search terminal devices 1 that have been searched.

In addition, when the distance information indicating a distance to the search terminal device 1 identified by the target address is acquired as first distance information and then is acquired again as second distance information by the third acquisition unit 130, the notification controller 140 causes the touch panel 12 to display a first distance change message 65 (refer to FIG. 6) indicating, based on a change in the second distance information relative to the first distance information, whether the search terminal device 1 identified by the target address is approached. The first distance change message 65 is an example of "distance change information". That is, in a situation in which the user is searching for the target terminal device 1 while walking around in the communication range of the receipt printer 2, when the first terminal device 1a approaches the second terminal device 1b or when the first terminal device 1a moves away from the second terminal device 1b, the notification controller 140 causes the touch panel 12 to display the first distance change message 65 indicating the approach or the moving away. This enables the user to determine whether the first terminal device 1a approaches the second terminal device 1b.

Figure 5:
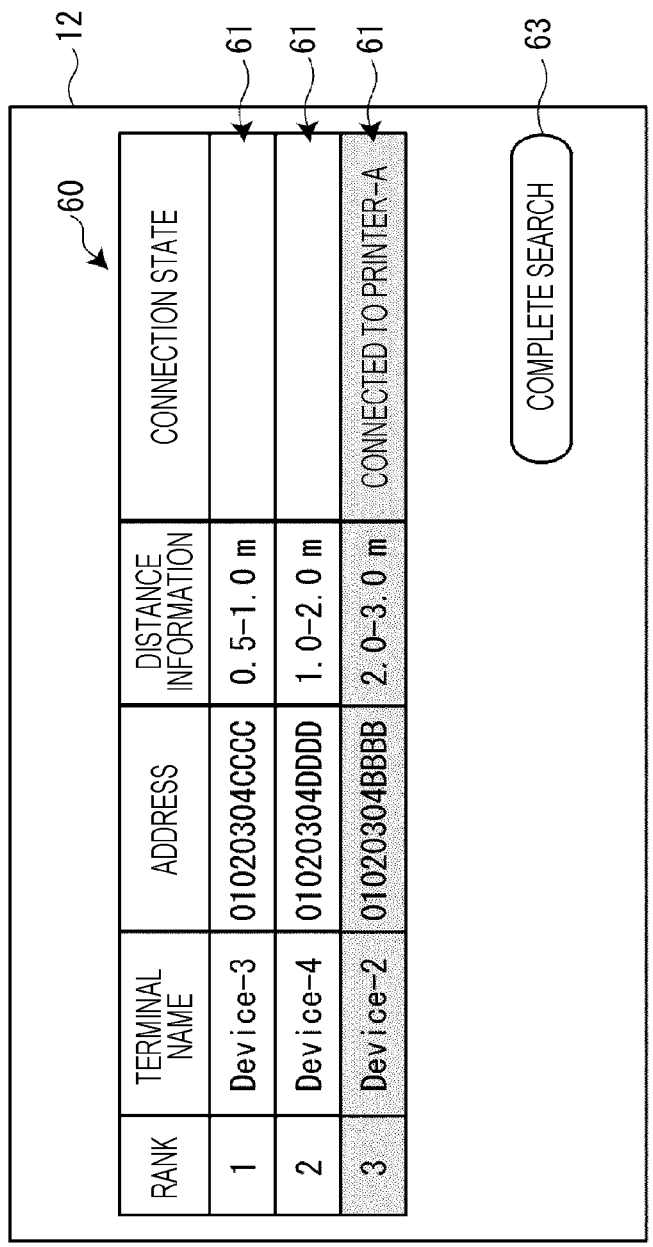
FIG. 5 is a diagram illustrating a display example of a search result list.
Figure 6:
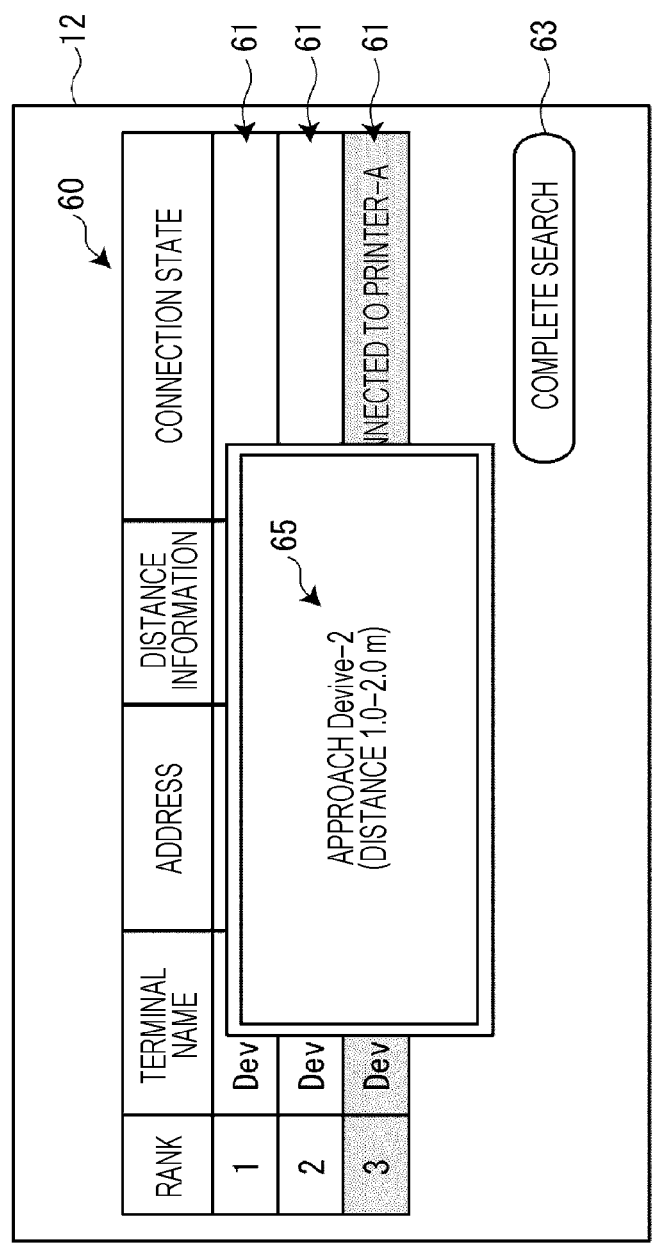
FIG. 6 is a diagram illustrating a display example of a first distance change message.

With reference to FIG. 5 and FIG. 6, the search result list 60 and the first distance change message 65 displayed on the touch panel 12 by the notification controller 140 are described. FIG. 5 is a diagram illustrating a display example of the search result list 60. The first terminal device 1a searches the terminal devices 1 in response to start of the search application 33 and causes the touch panel 12 to display the search result list 60 as a search result. While the search result list 60 is displayed on the touch panel 12, the first terminal device 1a causes a search complete button 63 to be displayed in the proximity of the search result list 60. When the search complete button 63 is selected by the user, the first terminal device 1a completes a search process described later with reference to FIG. 7.

The search result list 60 includes one or more pieces of device search information 61. The device search information 61 is information including terminal names, addresses, distance information, and connection states. In the example of FIG. 5, "Device-2", "Device-3", and "Device-4" are respectively the terminal names of the second terminal device 1b, the third terminal device 1c, and the fourth terminal device 1d. In addition, "01020304BBBB", "01020304CCCC", and "01020304DDDD" are respectively the addresses of the second terminal device 1b, the third terminal device 1c, and the fourth terminal device 1d.

The first terminal device 1a displays, as distance information, numbers indicating an approximate distance, such as "0.5-1.0 m". Additionally, the first terminal device 1a may display, as distance information, numbers indicating an upper limit value and a lower limit value of distances, such as "1.0 or less" and "0.5 m or more". The first terminal device 1a also display, as a connection state of the target terminal device 1, wording to the effect that the target terminal device 1 is connected to the receipt printer 2. The printer name "Printer-A" of the receipt printer 2 illustrated in FIG. 5 is a printer name acquired by the first acquisition unit 110.

When displaying the search result list 60, the first terminal device 1a displays one or more pieces of device search information 61 of the searched terminal devices 1 in order from the device search information 61 of the terminal device 1 with the closest distance to the first terminal device 1a by using the distance information included in the device search information 61 of each of the searched terminal devices 1. As described above, the first terminal device 1a displays the device search information 61 of the second terminal device 1b connected to the receipt printer 2, among the searched search terminal devices 1, in a different manner from those of the other search terminal devices 1.

In the example of FIG. 5, the first terminal device 1a displays, of the search result list 60, a row displaying the device search information 61 of the second terminal device 1b with the background color and displays rows displaying the respective pieces of device search information 61 of the other search terminal devices 1 without the background color. The first terminal device 1a may further cause the device search information 61 of the second terminal device 1b to differ from the respective pieces of device search information 61 of the other search terminal devices 1 in terms of the color of background color, the color of characters, the type of characters, and so on in addition to in terms of the presence or absence of background color as mentioned above.

FIG. 6 is a diagram illustrating a display example of the first distance change message 65. The first terminal device 1a displays the first distance change message 65 superimposed on the search result list 60. The first terminal device 1a acquires distance information in the order of the first distance information and the second distance information with the third acquisition unit 130 and, when the second distance information changes from the first distance information, displays the first distance change message 65 for a certain time period.

In the example of FIG. 6, the first terminal device 1a causes the first distance change message 65 indicating the approach of the first terminal device 1a to the second terminal device 1b and the second distance information to be displayed. Although the example of FIG. 6 indicates a display example in which the first terminal device 1a approaches the second terminal device 1b, the first terminal device 1a causes the first distance change message 65 indicating the movement of the first terminal device 1a away from the second terminal device 1b and the second distance information to be displayed when the first terminal device 1a moves away from the second terminal device 1b. The first terminal device 1a may display, instead of the first distance change message 65, an image indicating whether the first terminal device 1a approaches the second terminal device 1b.

Figure 7:
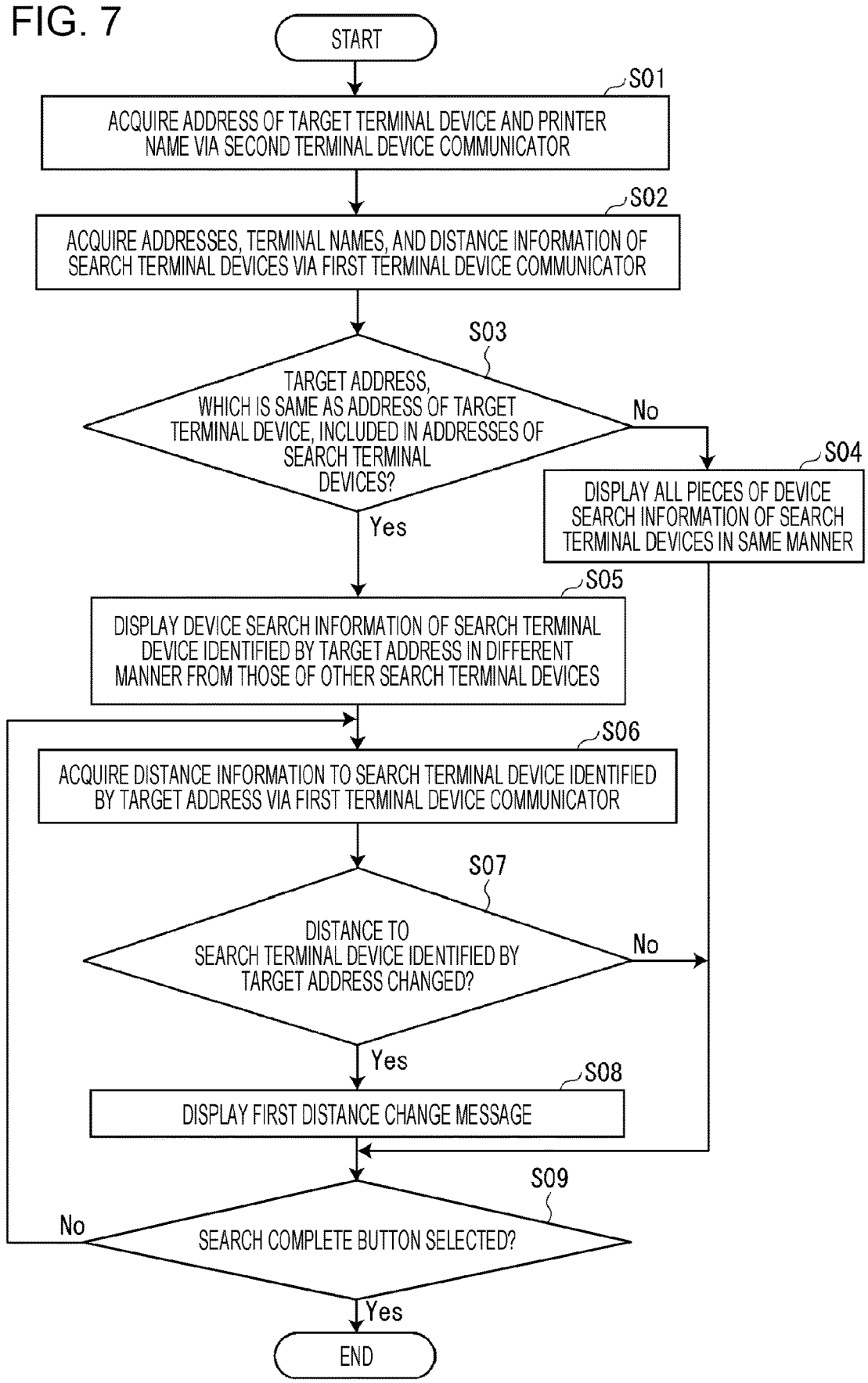
FIG. 7 is a flowchart illustrating a flow of a search process executed by the first terminal device.

FIG. 7 is a flowchart illustrating a flow of a search process executed by the first terminal device 1a. The search process begins when triggered by the start of the search application 33. At the time when the search application 33 is started, the first terminal device 1a is assumed to be at a location at which the first terminal device 1a is communicable with the receipt printer 2 by the second wireless communication 6. During execution of at least step S02 and step S06 described later, the first terminal device 1a is assumed to be at a location at which the first terminal device 1a is communicable with a plurality of search terminal devices 1 by the first wireless communication 5.

In step S01, the first terminal device 1a transmits a request signal via the second terminal device communicator 14 so as to acquire the address of the target terminal device 1 connected to the receipt printer 2 and the printer name of the receipt printer 2.

In step S02, the first terminal device 1a transmits search signals via the first terminal device communicator 13 so as to acquire the addresses, terminal names, and distance information of the search terminal devices 1. The first terminal device 1a acquires the addresses and terminal names of the search terminal devices 1 as response signals to the search signals. The first terminal device 1a measures distances to the search terminal devices 1 based on the signal intensities of the response signals to the search signals and acquires respective pieces of distance information indicating the measured distances. The order of step S01 and step S02 may be reversed.

In step S03, the first terminal device 1a determines whether the addresses of the search terminal devices 1 acquired in step S02 include the target address, which is the same as the first address of the target terminal device 1 acquired in step S01. If the first terminal device 1a determines that the addresses of the search terminal devices 1 include the target address, the first terminal device 1a proceeds to step S05. If the first terminal device 1a determines that the addresses of the search terminal devices 1 do not include the target address, the first terminal device 1a proceeds to step S04.

In step S04, the first terminal device 1a displays, as the search result list 60, all pieces of the device search information 61 of a plurality of search terminal devices 1 in the same manner. For example, the first terminal device 1a displays rows displaying the respective pieces of the device search information 61 of one or more search terminal devices 1 included in the search result list 60 such that background color is not applied to all the rows. After step S04, the first terminal device 1a proceeds to step S09.

In step S05, the first terminal device 1a displays the search result list 60 such that the device search information 61 of the search terminal device 1 identified by the target address is displayed in a different manner from those of the other search terminal devices 1. For example, the first terminal device 1a displays the search result list 60 illustrated in FIG. 5.

In step S06, the first terminal device 1a transmits a search signal to the search terminal device 1 identified by the target address via the first terminal device communicator 13 so as to acquire distance information indicating a distance from the first terminal device 1a to the search terminal device 1 identified by the target address. At this point, the search terminal device 1 identified by the target address transmits its address and terminal name as a response signal, and the first terminal device 1a acquires distance information based on the signal intensity of the response signal. In response to acquiring the distance information, the first terminal device 1a updates the distance information of the search terminal device 1 identified by the target address in the search result list 60.

In step S07, the first terminal device 1a determines based on the second distance information, which is the distance information acquired in step S06, and the first distance information, which is acquired previously, that is, in step S02 or step S06, whether the distance from the first terminal device 1a to the search terminal device 1 identified by the target address has changed. If the first terminal device 1a determines that the distance from the first terminal device 1a to the search terminal device 1 identified by the target address has changed, the first terminal device 1a proceeds to step S08. If the first terminal device 1a determines that the distance from the first terminal device 1a to the search terminal device 1 identified by the target address has not changed, the first terminal device 1a proceeds to step S09.

In step S08, the first terminal device 1a displays the first distance change message 65 (refer to FIG. 6) on the touch panel 12. After a certain period of time has elapsed since display of the first distance change message 65 was started, the first terminal device 1a hides the first distance change message 65 to return the display to the state illustrated in FIG. 5.

In step S09, the first terminal device 1a determines whether the search complete button 63 is selected. If the first terminal device 1a determines that the search complete button 63 is selected, the first terminal device 1a completes the search process. If the first terminal device 1a determines that the search complete button 63 is not selected, the first terminal device 1a returns to step S06.

As described above, the first terminal device 1a according to the first embodiment acquires the addresses, terminal names, and distance information of the search terminal devices 1 by transmitting search signals and displays the search result list 60 indicating the device search information 61 including these information items of each of the search terminal devices 1 on the touch panel 12. When the addresses of the search terminal devices 1 searched based on transmission of search signals include the same target address as the address of the target terminal device 1 connected to the receipt printer 2, the first terminal device 1a displays the device search information 61 of the search terminal device 1 identified by the target address in a different manner from those of the other search terminal devices 1. Therefore, the user may check at a glance the device search information 61 of the target terminal device 1 and may identify the target terminal device 1 among a plurality of terminal devices 1 by using distance information included in the device search information 61.

In addition, the first terminal device 1a displays, on the touch panel 12, the first distance change message 65 indicating whether the first terminal device 1a has approached the target terminal device 1. Therefore, the user may quickly identify the target terminal device 1 by walking around in the communication range of the receipt printer 2 while carrying the first terminal device 1a.

In the first embodiment, modifications described below may be employed.

Modification 1-1

Figure 8:
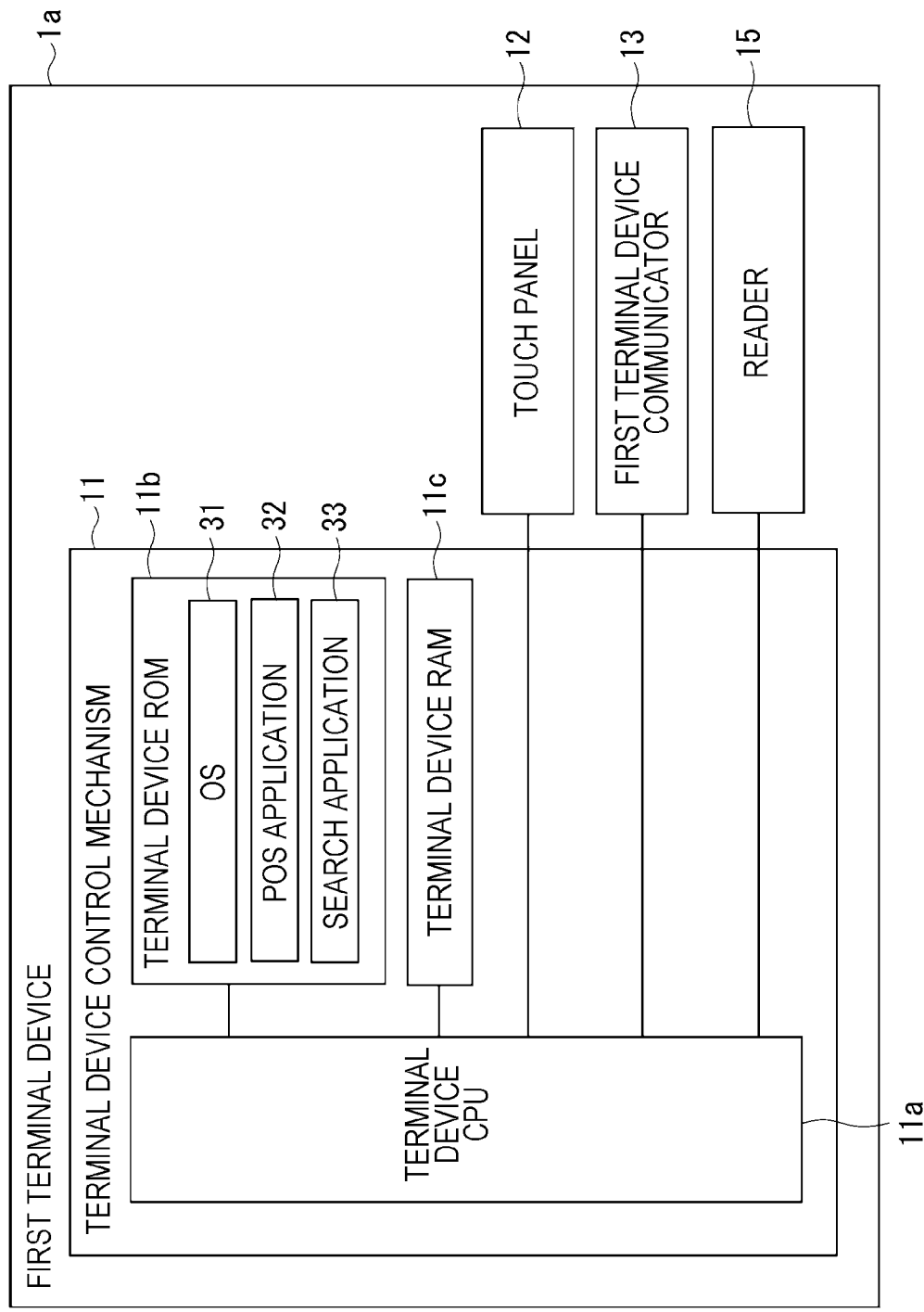
FIG. 8 is a block diagram illustrating a hardware configuration of a first terminal device according to a modification 1-1.

The first terminal device 1a may acquire the address of the target terminal device 1 via a reader 15, not via the second terminal device communicator 14. FIG. 8 is a block diagram illustrating a hardware configuration of the first terminal device 1a according to the present modification. The hardware configuration of the first terminal device 1a according to the present modification is a configuration in which the reader 15 is added to and the second terminal device communicator 14 is removed from the hardware configuration (refer to FIG. 2) of the first terminal device 1a according to the first embodiment. The reader 15 is, for example, a camera. The functional configuration of the first terminal device 1a according to the present modification is the same as the functional configuration (refer to FIG. 4) of the first terminal device 1a according to the first embodiment.

Figure 9:
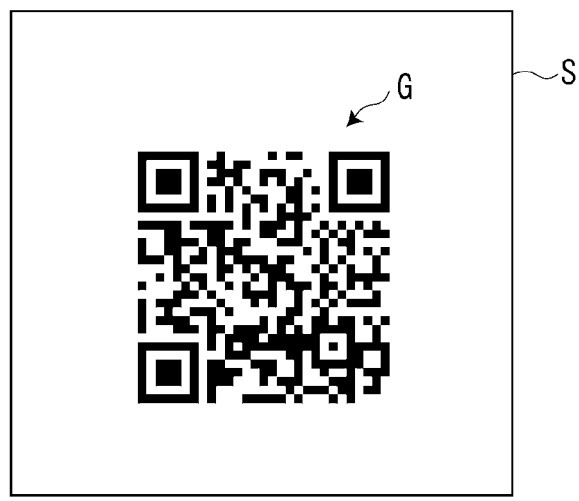
FIG. 9 is a diagram illustrating a printed result of the receipt printer according to the modification 1-1.

The receipt printer 2 according to the present modification prints two-dimensional code G on the printing medium S as illustrated in FIG. 9. The two-dimensional code G is an example of "identification information of a target terminal device". The receipt printer 2 prints the two-dimensional code G on the printing medium S based on a predetermined operation on the receipt printer 2. The reader 15 optically reads the two-dimensional code G printed on the printing medium S. The first acquisition unit 110 according to the present modification acquires the address of the target terminal device 1 and the printer name of the receipt printer 2 via the reader 15. That is, the first acquisition unit 110 reads the two-dimensional code G by the reader 15 and decode the read image, thereby acquiring the address of the target terminal device 1 and the printer name of the receipt printer 2.

In this way, according to the present modification, the address of the target terminal device 1 and other information may be acquired without providing the first terminal device 1a with the second terminal device communicator 14.

The receipt printer 2 may print code images, such as bar code, other than the two-dimensional code G on the printing medium S. The receipt printer 2 may also print text indicating the address of the target terminal device 1 and the printer name, not code images, on the printing medium S. In this case, the first terminal device 1a acquires the address of the target terminal device 1 and other information by performing character recognition on an image read by the reader 15.

Modification 1-2

Figure 10:
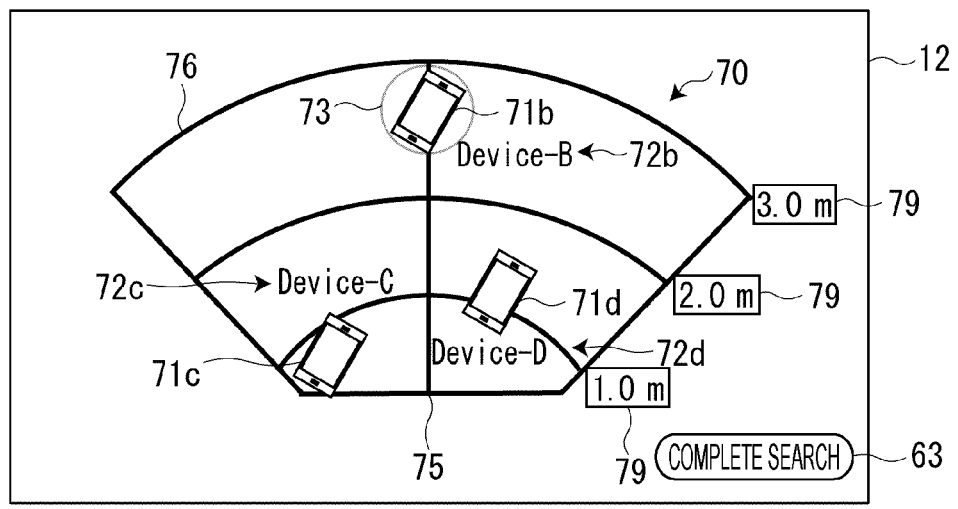
FIG. 10 is a diagram illustrating a display example of a search result image according to a modification 1-2.

The first terminal device 1a may display, as a search result by a search process, a search result image 70 as illustrated in FIG. 10, instead of displaying the search result list 60 (refer to FIG. 5). The search result image 70 is an image illustrating the positional relation of the second terminal device 1b, the third terminal device 1c, and the fourth terminal device 1d when viewed from the first terminal device 1a.

In the example of FIG. 10, the location of the first terminal device 1a corresponds to a reference position 75, and the locations of the second terminal device 1b, the third terminal device 1c, and the fourth terminal device 1d respectively correspond to the positions of a second terminal device image 71b, a third terminal device image 71c, and a fourth terminal device image 71d. In the example of FIG. 10, the first terminal device 1a displays, as the search result image 70, the second terminal device image 71b, the third terminal device image 71c, and the fourth terminal device image 71d in a fan-shaped display region 76 with the reference position 75 arranged near the center of a circle and additionally displays a second terminal device name 72b, a third terminal device name 72c, and a fourth terminal device name 72d in the vicinities of the respective terminal device images 71. The first terminal device 1a also displays circular arcs with different diameters as portions of the fan-shaped display region 76 and displays numerical information 79 indicating a rough estimate of the distance assigned to each of the circular arcs.

While the user is walking around in the vicinities of the second terminal device 1b, the third terminal device 1c, and the fourth terminal device 1d, the first terminal device 1a transmits a search signal to each of the terminal devices 1 a plurality of times so as to identify the relative position of each of these terminal devices 1 to the first terminal device 1a. The first terminal device 1a also identifies its orientation by using a gyroscope sensor and the like provided in the first terminal device 1a. The terminal device 1a displays the search result image 70 based on these identification results. The first terminal device 1a displays the second terminal device image 71b corresponding to the second terminal device 1b, which is the search terminal device 1 identified by the target address, in a different manner from those of the other search terminal devices 1. In the example of FIG. 10, the first terminal device 1a displays the second terminal device image 71b, around which a circle 73 is drawn, and the other terminal device images 71, around each of which the circle 73 is not drawn.

Figure 11:
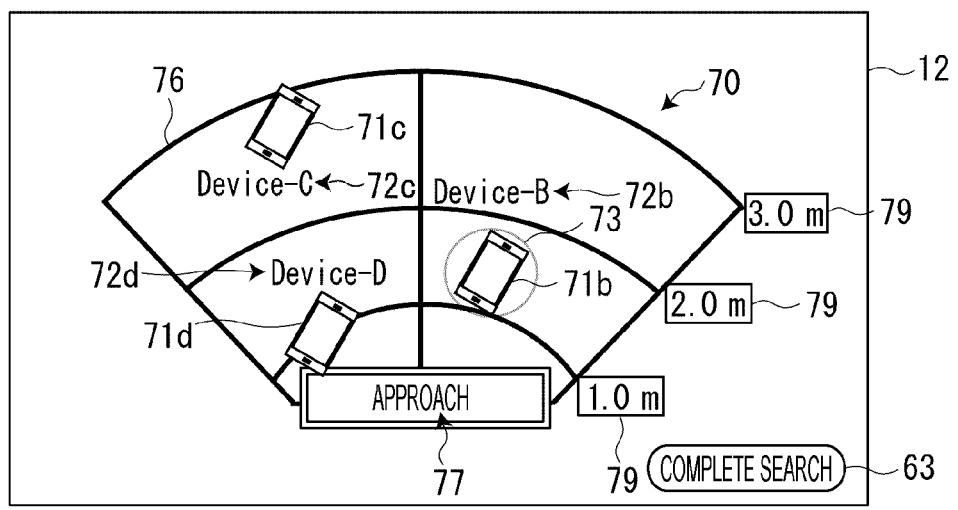
FIG. 11 is a diagram illustrating a display example of a second distance change message according to the modification 1-2.

FIG. 11 is a diagram illustrating a display example of the search result image 70 and a display example of a second distance change message 77 that are displayed when the first terminal device 1a approaches the second terminal device 1b after the search result image 70 illustrated in FIG. 10 has been displayed. FIG. 11 illustrates a situation in which the user has moved and thus the first terminal device 1a has approached the second terminal device 1b and the fourth terminal device 1d, and a change in the orientation of the user has resulted in a change in the arrangement of the second terminal device 71b, the third terminal device image 71c, and the fourth terminal device image 71d. In the example of FIG. 11, the first terminal device 1a causes the second distance change message 77, which indicates that the first terminal device 1a has approached the second terminal device 1b, to be displayed.

In this way, according to the present modification, using the search result image 70, the user may intuitively check the relative position of the second terminal device 1b to the first terminal device 1a and the distance from the first terminal device 1a to the second terminal device 1b.

Modification 1-3

The first terminal device 1a may display movement guidance information (not illustrated) in which the search terminal device 1 identified by the target address is the destination, instead of the second distance change message (refer to FIG. 11). In this case, while the user is walking around the vicinities of the second terminal device 1b, the third terminal device 1c, and the fourth terminal device 1d, the first terminal device 1a may transmit a search signal to each of the terminal devices 1 a plurality of times so as to identify the relative position of each of these terminal devices 1 to the first terminal device 1a, generate movement guidance information based on the identified relative positions, and display the generated movement guidance information. It is conceivable that the first terminal device 1a displays, as movement guidance information, text or images indicating the direction for movement and the distance, such as "move 3 m in the right direction" or "move 3 m to the front and then move 1 m in the left direction".

Modification 1-4

The first terminal device 1a may display, on the touch panel 12, only distance information to the second terminal device 1b, which is the search terminal device 1 identified by the target address, instead of the search result list 60 (refer to FIG. 5) or the search result image 70 (refer to FIG. 10).

Modification 1-5

The first terminal device 1*a* may notify the user of distance information to the second terminal device 1*b* in a way different from displaying. For example, the first terminal device 1*a* may include a voice output unit and provide a notification of the distance information to the second terminal device 1*b* as a voice message. In this case, the voice output unit is an example of the "notifier". The first terminal device 1*a* may also include a plurality of indicators provided at respective distances serving as criteria, such as 1 m, 2 m, and 3 m, and light any one of the plurality of indicators to provide a notification of the distance information to the second terminal device 1*b*. In this case, the plurality of indicators is an example of the "notifier".

Modification 1-6

The first terminal device 1*a* may transmit a notification command signal for causing notification information to be displayed to the second terminal device 1*b*, which is the search terminal device 1 identified by the target address. The search terminal device 1 is assumed to include a touch panel. In this case, the search terminal device 1 that has received the notification command signal displays notification information on the touch panel. The search terminal device 1 that has received the notification command signal displays a message, such as "This terminal device is connected to Printer-A", as notification information on the touch panel. With this configuration, using notification information displayed on the touch panel 12 of the search terminal device 1, the user may reliably identify the target terminal device 1. The search terminal device 1 that has received the notification command signal may provide a notification, such as causing a vibrator, which outputs notification sound, to vibrate, instead of displaying notification information.

Modification 1-7

The first wireless communication 5 may be another wireless communication such as Wi-Fi (registered trademark) communication, not Bluetooth communication. Wi-Fi communication allows a plurality of terminal devices 1 to be connected to one receipt printer 2 but only one terminal device 1 that is connected first among the plurality of terminal devices 1 is allowed to perform communication. Accordingly, when the first wireless communication 5 is Wi-Fi communication, the target terminal device 1 refers to the terminal device 1 that is communicable with the receipt printer 2.

Modification 1-8

The second wireless communication 6 may be another wireless communication such as near field communication (NFC) or Wi-Fi communication, not BLE communication. The first terminal device 1*a* may communicate with the receipt printer 2 via wired connection with, for example, a universal serial bus (USB) instead of the second wireless communication 6. When the first wireless communication 5 is Wi-Fi communication, the second wireless communication 6 may be Bluetooth communication. When the first wireless communication 5 is Wi-Fi communication, the first terminal device 1*a* may use the first terminal device communicator 13 as a first port of the Wi-Fi communication and the second terminal device communicator 14 as a second port of the Wi-Fi communication.

Modification 1-9

When the first wireless communication 5 is Wi-Fi communication, the first terminal device 1*a* may perform Wi-Fi Direct communication with another terminal device 1 and measure the distance from the first terminal device 1*a* to the other terminal device 1 using the electric field intensity of communication waves of Wi-Fi Direct. When the first terminal device 1*a* is able to perform infrared wave communication with another terminal device 1, the first terminal device 1*a* may perform infrared wave communication with the other terminal device 1 and measure the distance from the first terminal device 1*a* to the other terminal device 1 using the reception intensity of an infrared signal transmitted from the other terminal device 1.

Modification 1-10

The functions of the search application 33 may be included in the POS application 32. In the present modification, the POS application 32 is an example of a "program". In this case, using the POS application 32, the first terminal device 1*a* requests the receipt printer 2 to perform communication using the first wireless communication 5 and, when the communication is disconnected by the receipt printer 2, the first terminal device 1*a* may automatically start the search process illustrated in FIG. 7.

Alternatively, when the user performs a predetermined operation on an operation screen (not illustrated) provided by the POS application 32, the first terminal device 1*a* may be triggered to start the search process illustrated in FIG. 7.

Modification 1-11

In the search result list 60, the first terminal device 1*a* does not display the entire device search information 61 of the search terminal device 1 identified by the target address in a different manner from those of the other search terminal devices 1 but may display part of the device search information 61 of the search terminal device 1 identified by the target address in a different manner from those of the other search terminal devices 1. For example, the first terminal device 1*a* may display at least one of the address or the distance information of the search terminal device 1 identified by the target address in a different manner from those for the other search terminal devices 1.

Modification 1-12

The first terminal device 1*a* may store the addresses and terminal names of the terminal devices 1 in association with each other in the first terminal device 1*a* and, in response to acquiring the address from the search terminal device 1, cause the terminal name stored in association with the acquired address to be displayed as part of the device search information 61. In this case, the terminal name is an example of "display information corresponding to identification information". With this configuration, the second acquisition unit 120 need not acquire terminal names from the search terminal devices 1.

Second Embodiment

Next, a second embodiment of the present disclosure will be described. In the first embodiment described above, the first terminal device 1*a* acquires distance information indicating a distance from the first terminal device 1*a* to the search terminal device 1. However, in the second embodiment, the first terminal device 1*a* acquires location information indicating the location of the search terminal device 1. Only points different from those in the first embodiment will be described below. In the second embodiment, the same elements as in the first embodiment are denoted by the same reference numerals as in the first embodiment and detailed description of the elements is omitted. Modifications applied to the same elements as in the first embodiment are applied similarly to those in the second embodiment.

Figure 12:
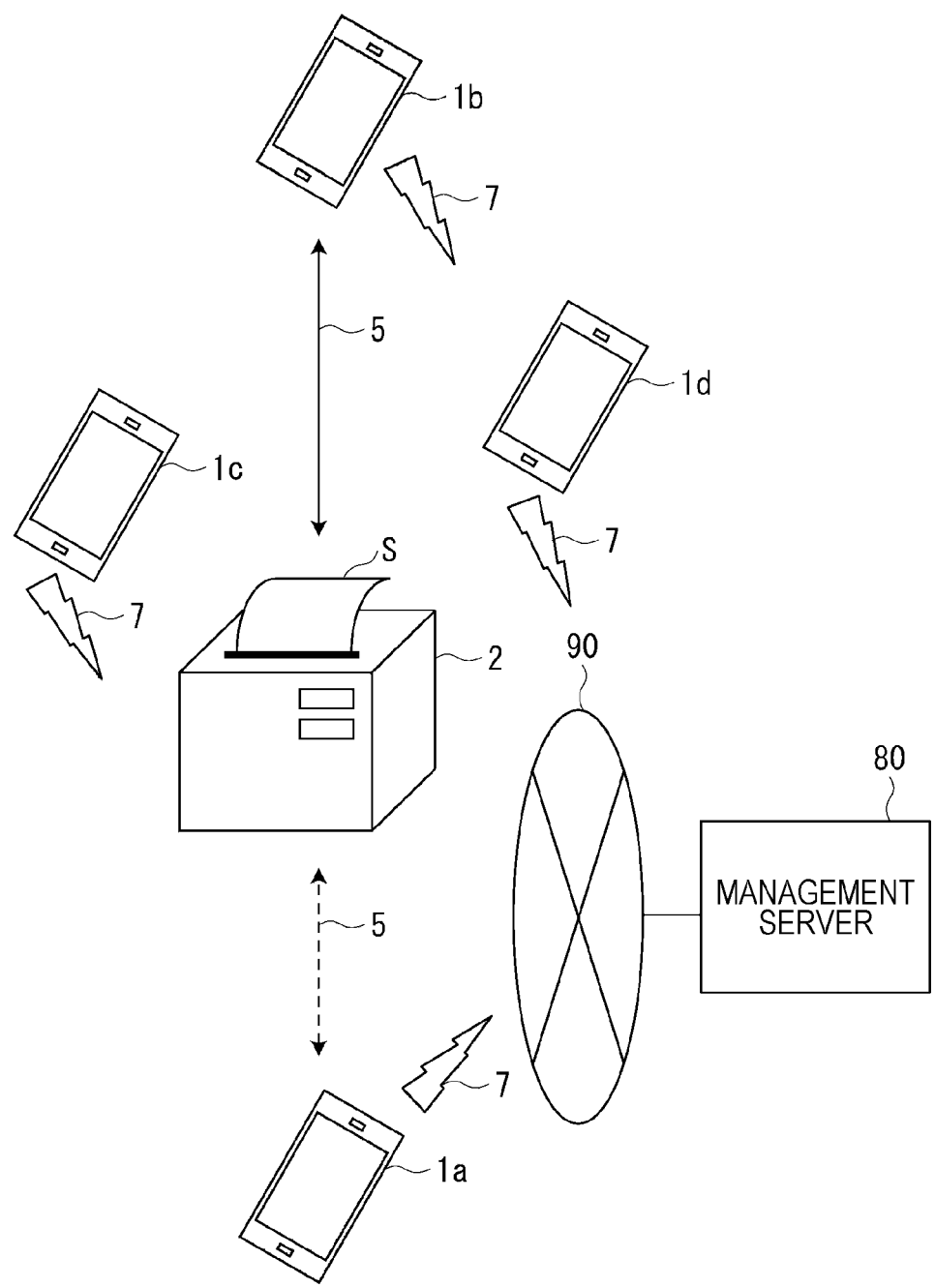
FIG. 12 is a diagram illustrating an example of a usage pattern of a first terminal device according to a second embodiment.

FIG. 12 is a diagram illustrating an example of a usage pattern of the first terminal device 1*a* according to the second embodiment. In the second embodiment, the first terminal device 1a, the second terminal device 1b, the third terminal device 1c, and the fourth terminal device 1d are all connected via network wireless communication 7 and the Internet 90 to a management server 80. The network wireless communication 7 is, for example, Wi-Fi communication.

The management server 80 manages the location information of the terminal device 1 by regularly acquiring the location information of the terminal device 1 from the terminal device 1. The location information is, for example, global positioning system (GPS) information. In response to a request for location information from the first terminal device 1a, the management server 80 transmits the addresses, terminal names, and location information of the terminal devices 1 located within the range of a predetermined distance from the first terminal device 1a to the first terminal device 1a.

Figure 13:
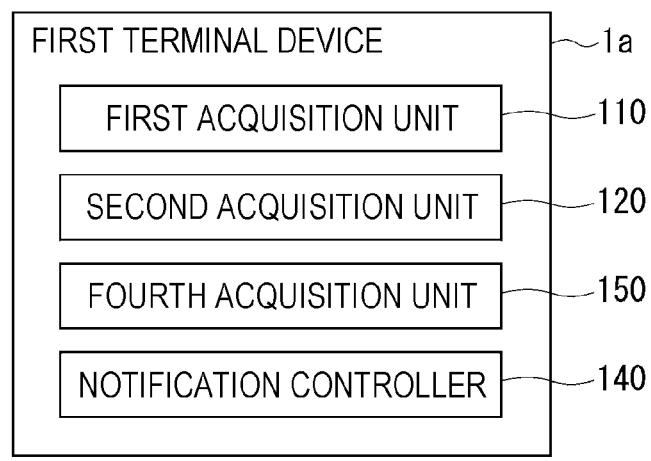
FIG. 13 is a block diagram illustrating a functional configuration of the first terminal device according to the second embodiment.

FIG. 13 is a block diagram illustrating a functional configuration of the first terminal device 1a according to the second embodiment. The functional configuration of the first terminal device 1a according to the second embodiment is a configuration in which a fourth acquisition unit 150 is added to and the third acquisition unit 130 is removed from the functional configuration (refer to FIG. 4) of the first terminal device 1a of the first terminal device 1a according to the first embodiment. The fourth acquisition unit 150 is a function implemented by the terminal device CPU 11a executing the search application 33.

The second acquisition unit 120 according to the second embodiment transmits a search signal to the management server 80 and thus acquires, as response information to the search signal, the addresses and terminal names of the terminal devices 1 located within the range of the predetermined distance from the first terminal device 1a. The fourth acquisition unit 150 acquires respective pieces of location information indicating the locations of the search terminal devices 1. The fourth acquisition unit 150 acquires the location information transmitted concurrently with transmission of addresses and terminal names as response information to the search signal from the management server 80.

Using information acquired by the second acquisition unit 120 and the fourth acquisition unit 150, the notification controller 140 according to the second embodiment causes the touch panel 12 to display a search result list (not illustrated) in which, for each of the search terminal devices 1, the terminal name, the address, the location information, and the connection state of the search terminal device 1 are associated with one another.

When the addresses of the search terminal devices 1 acquired by the second acquisition unit 120 include a target address that is the same as the address of the target terminal device 1 acquired by the first acquisition unit 110, the notification controller 140 according to the second embodiment causes the touch panel 12 to display device search information including the terminal name, address, location information, and connection state of the search terminal device 1 identified by the target address in a different manner from those for the other search terminal devices 1.

When the location information of the search terminal device 1 identified by the target address is acquired as first location information and then is acquired again as second location information by the fourth acquisition unit 150, the notification controller 140 according to the second embodiment causes the touch panel 12 to display a distance change message (not illustrated) indicating whether the first terminal device 1a has approached the search terminal device 1 identified by the target address, based on the location of the first terminal device 1a when the first location information is acquired and the location indicated by the first location information and on the location of the first terminal device 1a when the second location information is acquired and the location indicated by the second location information.

Figure 14:
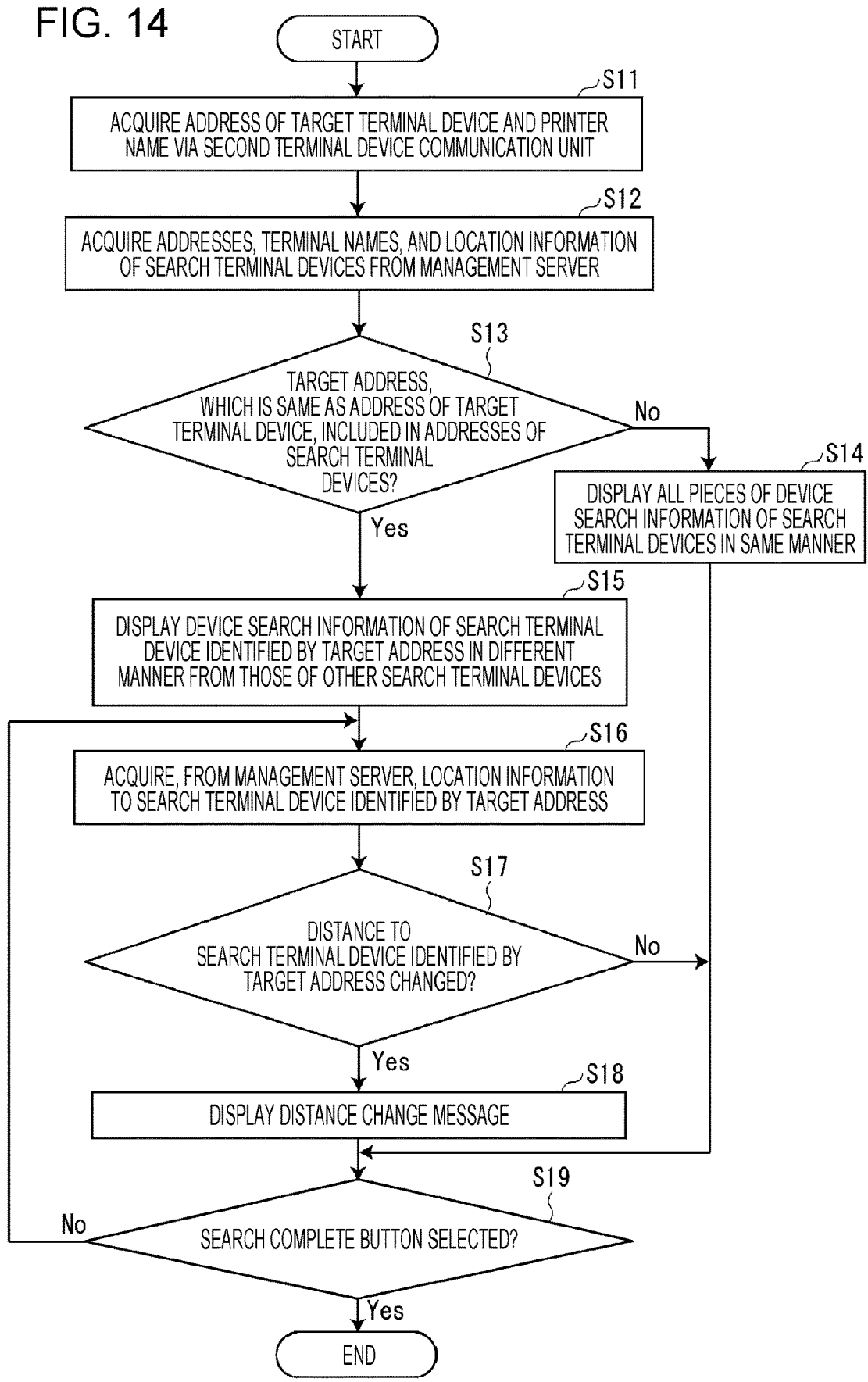
FIG. 14 is a flowchart illustrating a flow of a search process executed by the first terminal device according to the second embodiment.

FIG. 14 is a flowchart illustrating a flow of a search process executed by the first terminal device 1a according to the second embodiment. During execution of at least steps S12 and S16 described later, the first terminal device 1a is assumed to be at a location at which the first terminal device 1a is communicable with the management server 80 by the second wireless communication 7.

In step S11, the first terminal device 1a acquires the address of the target terminal device 1 connected to the receipt printer 2 and the printer name of the receipt printer 2 via the second terminal device communicator 14.

In step S12, the first terminal device 1a acquires the addresses, terminal names, and location information of the search terminal devices 1 from the management server 80. The order of step S11 and step S12 may be reversed.

In step S13, the first terminal device 1a determines whether the addresses of the search terminal devices 1 acquired in step S12 include the target address, which is the same as the address of the target terminal device 1 acquired in step S11. If the first terminal device 1a determines that the addresses of the search terminal devices 1 include the target address, the first terminal device 1a proceeds to step S15. If the first terminal device 1a determines that the addresses of the search terminal devices 1 do not include the target address, the first terminal device 1a proceeds to step S14.

In step S14, the first terminal device 1a displays, as a search result list, all pieces of the device search information of a plurality of search terminal devices 1 in the same manner. After step S14, the first terminal device 1a proceeds to step S19.

In step S15, the first terminal device 1a displays, as a search result list, the device search information of the search terminal device 1 identified by the target address in a different manner from those for the other search terminal devices 1.

In step S16, the first terminal device 1a acquires the location information indicating the location of the search terminal device 1 identified by the target address from the management server 80. At this point, the management server 80 transmits, as response information to the search signal, the addresses, terminal names, and location information of the terminal devices 1 located within the range of the predetermined distance from the first terminal device 1a, and the first terminal device 1a acquires, from them, the location information of the search terminal device 1 identified by the target address.

In step S17, using the second location information, which is the location information acquired in step S16, and the first location information, which is acquired previously, that is, in step S12 or step S16, the first terminal device 1a determines whether the distance from the first terminal device 1a to the search terminal device 1 identified by the target address has changed. If the first terminal device 1a determines that the distance from the first terminal device 1a to the search terminal device 1 identified by the target address has changed, the first terminal device 1a proceeds to step S18. If the first terminal device 1a determines that the distance from the first terminal device 1a to the search terminal device 1 identified by the target address has not changed, the first terminal device 1a proceeds to step S19.

In step S18, the first terminal device 1*a* displays a distance change message on the touch panel 12.

In step S19, the first terminal device 1*a* determines whether the search complete button 63 is selected. If the first terminal device 1*a* determines that the search complete button 63 is selected, the first terminal device 1*a* completes the search process. If the first terminal device 1*a* determines that the search complete button 63 is not selected, the first terminal device 1*a* returns to step S16.

As described above, the first terminal device 1*a* according to the second embodiment acquires the addresses, terminal names, and location information of the search terminal devices 1 by communicating with the management server 80 and displays a search result list indicating the device search information including these information items of each of the search terminal devices 1 on the touch panel 12. When the addresses of the search terminal devices 1 acquired from the management server 80 include the same target address as the address of the target terminal device 1 connected to the receipt printer 2, the first terminal device 1*a* displays the device search information of the search terminal device 1 identified by the target address in a different manner from those for the other search terminal devices 1. Therefore, the user may check at a glance the device search information of the target terminal device 1 and may identify the target terminal device 1 among a plurality of terminal devices 1 by using location information included in the device search information.

In addition, the first terminal device 1*a* displays, on the touch panel 12, a distance change message indicating whether the first terminal device 1*a* has approached the target terminal device 1. Therefore, the user may quickly identify the target terminal device 1 by walking around in the communication range of the receipt printer 2 while carrying the first terminal device 1*a*.

In the second embodiment, modifications described below may be employed.

Modification 2-1

The first terminal device 1*a* may acquire the addresses, terminal names, and location information of the search terminal devices 1 directly from the terminal devices 1, instead of acquiring them from the management server 80. In this case, the first terminal device 1*a* may transmit search signals to the terminal devices 1 within the communication range of the first wireless communication 5 and acquire, as the response signals, the addresses, terminal names, and location information of the search terminal devices 1.

Modification 2-2

The first terminal device 1*a* may display a search result image as illustrated in FIG. 10 instead of the search result list. Alternatively, the first terminal device 1*a* may cause the search application 33 to cooperate with a map application (not illustrated) and cause the locations of the search terminal devices 1 to be displayed on the map. The first terminal device 1*a* may display only the location information of the second terminal device 1*b*, which is the search terminal device 1 identified by the target address, on the touch panel 12.

Other Modifications

The embodiments described above may be applied to, instead of the receipt printer 2, a printing apparatus using copy paper as a printing medium. In addition, the embodiments described above may be applied to an electronic device having a wireless communication function, as well as the printing apparatus. In addition, the above embodiments and modifications may be combined. In addition, the search application 33 recorded in a computer-readable recording medium may be sold or lent. In other ways, various changes may be made as appropriate without departing from the scope of the disclosure.

Appendices

Hereinafter, appendices for a terminal device, a method for controlling a terminal device, and a recording medium will be provided.

The terminal device 1 includes the first terminal device communicator 13 configured to transmit print data to the receipt printer 2 via wireless communication, the first acquisition unit 110 configured to acquire identification information of the target terminal device 1 in a communicable state with the receipt printer 2, the second acquisition unit 120 configured to acquire respective pieces of identification information of one or more search terminal devices 1 searched based on transmission of one or more search signals for searching for the target terminal device 1, the third acquisition unit 130 configured to acquire respective pieces of distance information indicating distances to the one or more search terminal devices 1, a notifier configured to notify a user of information, and the notification controller 140 configured to, when the respective pieces of identification information of the one or more search terminal devices 1 acquired by the second acquisition unit 120 include target identification information that is identification information identical to the identification information of the target terminal device 1 acquired by the first acquisition unit 110, cause the notifier to provide a notification of the distance information indicating a distance to the search terminal device 1 identified by the target identification information among the respective pieces of distance information acquired by the third acquisition unit 130.

A method for the terminal device 1 is a method for controlling the terminal device 1 that transmits print data to the receipt printer 2 via wireless communication. The terminal device 1 performs acquiring identification information of the target terminal device 1 in a communicable state with the receipt printer 2, acquiring respective pieces of identification information of one or more search terminal devices 1 searched based on transmission of one or more search signals for searching for the target terminal device 1, acquiring respective pieces of distance information indicating distances to the one or more search terminal devices 1, and, when the respective pieces of acquired identification information of the one or more search terminal devices 1 include target identification information that is identification information identical to the acquired identification information of the target terminal device 1, providing a notification of the distance information indicating a distance to the search terminal device 1 identified by the target identification information among the respective pieces of acquired distance information.

A recording medium records a program that causes the terminal device 1, which transmits print data to the receipt printer 2 via wireless communication, to execute acquiring identification information of the target terminal device 1 in a communicable state with the receipt printer 2, acquiring respective pieces of identification information of one or more search terminal devices 1 searched based on transmission of one or more search signals for searching for the target terminal device 1, acquiring respective pieces of distance information indicating distances to the one or more search terminal devices 1, and, when the respective pieces of acquired identification information of the one or more search terminal devices 1 include target identification information that is identification information identical to the acquired identification information of the target terminal device 1, providing a notification of the distance information indicating a distance to the search terminal device 1 identified by the target identification information among the respective pieces of acquired distance information. The recording medium is a non-transitory computer-readable recording medium.

With this configuration, when the search terminal devices 1 searched based on transmission of a search signal include the target terminal device 1 in a communicable state with the receipt printer 2, the terminal device 1 notifies the user of distance information indicating a distance to the target terminal device 1. Therefore, the user may identify the target terminal device 1 by using the distance information of which the user is notified.

The terminal device 1 mentioned above may further include the second terminal device communicator 14 configured to receive, from the receipt printer 2, the identification information of the target terminal device 1, and the first acquisition unit 110 may be configured to acquire, via the second terminal device communicator 14, the identification information of the target terminal device 1.

With this configuration, the terminal device 1 may acquire the identification information of the target terminal device 1 via the second terminal device communicator 14.

The terminal device 1 mentioned above may further include the reader 15 configured to read the identification information of the target terminal device 1 printed on a printing medium by the receipt printer 2, and the first acquisition unit 110 may be configured to acquire, via the reader 15, the identification information of the target terminal device 1.

With this configuration, the terminal device 1 may acquire the identification information of the target terminal device 1 by reading information printed on a printing medium.

In the terminal device 1 mentioned above, the notifier may be the touch panel 12 configured to display information, and the notification controller 140 may be configured to, when the respective pieces of identification information of the one or more search terminal devices 1 acquired by the second acquisition unit 120 include the target identification information, cause the touch panel 12 to display, for each of the one or more search terminal devices 1, display information corresponding to the identification information of the search terminal device 1 in association with the distance information, and cause the touch panel 12 to display at least one of the display information or the distance information of the search terminal device 1 identified by the target identification information in a manner different from manners for other search terminal devices 1.

With this configuration, the terminal device 1 causes display information corresponding to the identification information of the search terminal device 1 in association with the distance information to be displayed, and causes at least one of the display information or the distance information of the search terminal device 1 identified by the target identification information in a manner different from those for the other search terminal devices 1. Therefore, the user may accurately identify the target terminal device 1.

In the terminal device 1 described above, when the distance information indicating a distance to the search terminal device 1 identified by the target identification information is acquired as first distance information and then is acquired again as second distance information by the third acquisition unit 130, the notification controller 140 may cause the notifier to provide a notification of distance change information indicating, based on a change in the second distance information relative to the first distance information, whether the search terminal device 1 identified by the target identification information is approached.

With this configuration, the terminal device 1 notifies the user of distance change information indicating whether the target terminal device 1 is approached. Therefore, the user may quickly identify the target terminal device 1.

The terminal device 1 includes the first terminal device communicator 13 configured to transmit print data to the receipt printer 2 via wireless communication, the first acquisition unit 110 configured to acquire identification information of the target terminal device 1 in a communicable state with the receipt printer 2, the second acquisition unit 120 configured to acquire respective pieces of identification information of one or more search terminal devices 1 searched based on transmission of one or more search signals for searching for the target terminal device 1, a fourth acquisition unit configured to acquire respective pieces of location information indicating locations of the one or more search terminal devices 1, a notifier configured to notify a user of information, and the notification controller 140 configured to, when the respective pieces of identification information of the one or more search terminal devices 1 acquired by the second acquisition unit 120 include target identification information that is identification information identical to the identification information of the target terminal device 1 acquired by the first acquisition unit 110, cause the notifier to provide a notification of the location information indicating a location of the search terminal device 1 identified by the target identification information among the respective pieces of location information acquired by the fourth acquisition unit.

With this configuration, when the search terminal devices 1 searched based on transmission of a search signal include the target terminal device 1 in a communicable state with the receipt printer 2, the terminal device 1 notifies the user of location information indicating the location of the target terminal device 1. Therefore, the user may identify the target terminal device 1 by using the location information.

What is claimed is:
1. A terminal device comprising:
a first communicator configured to transmit print data to a printing apparatus via wireless communication;
a first acquisition unit configured to acquire identification information of a target terminal device in a communicable state with the printing apparatus;
a second acquisition unit configured to acquire respective pieces of identification information of one or more search terminal devices searched based on transmission of one or more search signals for searching for the target terminal device;
a third acquisition unit configured to acquire respective pieces of distance information indicating distances to the one or more search terminal devices;
a notifier configured to notify a user of information; and
a notification controller configured to, when the respective pieces of identification information of the one or more search terminal devices acquired by the second acquisition unit include target identification information that is identification information identical to the identification information of the target terminal device acquired by the first acquisition unit, cause the notifier to provide a notification of the distance information indicating a distance to the search terminal device identified by the target identification information among the respective pieces of distance information acquired by the third acquisition unit.

2. The terminal device according to claim 1, further comprising:
a second communicator configured to receive, from the printing apparatus, the identification information of the target terminal device, wherein
the first acquisition unit is configured to acquire, via the second communicator, the identification information of the target terminal device.

3. The terminal device according to claim 1, further comprising:
a reader configured to read the identification information of the target terminal device printed on a printing medium by the printing apparatus, wherein
the first acquisition unit is configured to acquire, via the reader, the identification information of the target terminal device.

4. The terminal device according to claim 1, wherein
the notifier is a display configured to display information, and
the notification controller is configured to, when the respective pieces of identification information of the one or more search terminal devices acquired by the second acquisition unit include the target identification information, cause the display to display, for each of the one or more search terminal devices, display information corresponding to the identification information of the search terminal device in association with the distance information, and cause the display to display at least one of the display information or the distance information of the search terminal device identified by the target identification information in a manner different from manners for other ones of the search terminal devices.

5. The terminal device according to claim 1, wherein the notification controller is configured to, when the distance information indicating a distance to the search terminal device identified by the target identification information is acquired as first distance information and is then acquired again as second distance information by the third acquisition unit, cause the notifier to provide a notification of distance change information indicating, based on a change in the second distance information relative to the first distance information, whether the search terminal device identified by the target identification information is approached.

6. A terminal device comprising:
a first communicator configured to transmit print data to a printing apparatus via wireless communication;
a first acquisition unit configured to acquire identification information of a target terminal device in a communicable state with the printing apparatus;
a second acquisition unit configured to acquire respective pieces of identification information of one or more search terminal devices searched based on transmission of one or more search signals for searching for the target terminal device;
a fourth acquisition unit configured to acquire respective pieces of location information indicating locations of the one or more search terminal devices;
a notifier configured to notify a user of information; and
a notification controller configured to, when the respective pieces of identification information of the one or more search terminal devices acquired by the second acquisition unit include target identification information that is identification information identical to the identification information of the target terminal device acquired by the first acquisition unit, cause the notifier to provide a notification of the location information indicating a location of the search terminal device identified by the target identification information among the respective pieces of location information acquired by the fourth acquisition unit.

7. A method for controlling a terminal device that transmits print data to a printing apparatus via wireless communication, the method comprising:
acquiring identification information of a target terminal device in a communicable state with the printing apparatus;
acquiring respective pieces of identification information of one or more search terminal devices searched based on transmission of one or more search signals for searching for the target terminal device;
acquiring respective pieces of distance information indicating distances to the one or more search terminal devices; and
when the respective pieces of acquired identification information of the one or more search terminal devices include target identification information that is identification information identical to the acquired identification information of the target terminal device, providing a notification of the distance information indicating a distance to the search terminal device identified by the target identification information among the respective pieces of acquired distance information.

8. The method according to claim 7, wherein the providing the notification includes:
when the respective pieces of acquired identification information of the one or more search terminal devices include the target identification information, displaying, for each of the one or more search terminal devices, display information corresponding to the identification information of the search terminal device in association with the distance information on a display, and
displaying, on the display, at least one of the display information or the distance information of the search terminal device identified by the target identification information in a manner different from manners for other ones of the search terminal devices.

9. The method according to claim 7, wherein the providing the notification includes:
when the distance information indicating a distance to the search terminal device identified by the target identification information is acquired as first distance information and is then acquired again as second distance information by the third acquisition unit, providing a notification of distance change information indicating, based on a change in the second distance information relative to the first distance information, whether the search terminal device identified by the target identification information is approached.

10. A non-transitory computer-readable recording medium recording a program that causes a terminal device, which transmits print data to a printing apparatus via wireless communication, to execute:
acquiring identification information of a target terminal device in a communicable state with the printing apparatus;
acquiring respective pieces of identification information of one or more search terminal devices searched based on transmission of one or more search signals for searching for the target terminal device;

acquiring respective pieces of distance information indicating distances to the one or more search terminal devices; and when the respective pieces of acquired identification information of the one or more search terminal devices include target identification information that is identification information identical to the acquired identification information of the target terminal device, providing a notification of the distance information indicating a distance to the search terminal device identified by the target identification information among the respective pieces of acquired distance information.

\* \* \* \* \*